United States Patent [19]

Bahl et al.

[11] Patent Number: 5,615,299
[45] Date of Patent: Mar. 25, 1997

[54] SPEECH RECOGNITION USING DYNAMIC FEATURES

[75] Inventors: Lahit R. Bahl, Amawalk, N.Y.; Peter V. de Souza, San Jose, Calif.; Ponani Gopalakrishnan, Yorktown Heights; Michael A. Picheny, White Plains, both of N.Y.

[73] Assignee: International Business Machines Corporation, Armonk, N.Y.

[21] Appl. No.: 262,093

[22] Filed: Jun. 20, 1994

[51] Int. Cl.$^6$ .................... G10L 7/08; G10L 5/06
[52] U.S. Cl. .............. 395/2.63; 395/2.65; 395/2.49; 395/2.51; 395/2.42
[58] Field of Search ................... 395/2.4, 2.49, 395/2.51, 2.6, 2.63, 2.64, 214; 381/41, 42, 43, 45

[56] References Cited

U.S. PATENT DOCUMENTS

| | | | |
|---|---|---|---|
| 4,741,036 | 4/1988 | Bahl et al. | 381/43 |
| 5,072,452 | 12/1991 | Brown et al. | 381/43 |

FOREIGN PATENT DOCUMENTS

| | | |
|---|---|---|
| 0285353A2 | 10/1988 | European Pat. Off. . |
| 0388067A2 | 9/1990 | European Pat. Off. . |
| 0515709A1 | 12/1992 | European Pat. Off. . |

OTHER PUBLICATIONS

"Vector Quantization Procedure For Speech Recognition Systems Using Discrete Parameter Phoneme–Based Markov Word Models" IBM Technical Disclosure Bulletin, vol. 32, No. 7, Dec. 1989 pp. 320–321.

"Phoneme Recognition Using Time–Delay Neural Networks", by Waibel, A. et al., IEEE Transactions on Acoustics, Speech and Signal Processing, vol. 37, No. 3 1989 pp. 328–339.

"Admissible Strategies for Reducing Search Effort in Real Time Speech Recognition Systems" by L. R. Bahl, et al Elsevier Science Publishers B.V., 1990 pp.1371–1374.

"Application of an Auditory Model to Speech Recognition" by Jordan Cohen, J. Acoust, Soc.Am 85 (6), Jun. 1989 pp. 2623–2629.

"An IBM Based Large–Vocabulary Isolated–Utterance Speech Recognizer" by A. Averbuch et al. 1986 IEEE pp. 53–56.

"Syllogistic Reasoning in Fuzzy Logic and its Application to Usuality And Reasoning with Dispositions", by Lofti A. Zadeh, 1985 IEEE, pp. 754–762.

"A Method For The Construction of Acoustic Markov Models for Words" by L. R. Bahl et al., 1993 IEEE pp. 443–452 (vol. 1, No. 4).

"Speech Recognition Using Noise–Adaptive Prototypes" by Arthur Nadas, D. Nahamoo, IEEE Transactions on Acoustics, vol. 37, No. 10, Oct. 1989, pp. 1495–1503.

"Differential Competitive Learning For Centroid Estimation and Phoneme Recognition" by S. Kong and B. Kosko, IEEE Transactions on Neural Networks, vol. 2, No. 1, Jan. 1991, pp. 118–124.

(List continued on next page.)

Primary Examiner—Allen R. MacDonald
Assistant Examiner—Tálivaldis Ivais Šmits
Attorney, Agent, or Firm—Perman & Green, LLP

[57] ABSTRACT

A speech recognition technique utilizes a set of N different principal discriminant matrices. Each principal discriminant matrix is associated with a distinct class. The class is an indication of the proximity of a speech segment to neighboring phones. A technique for speech encoding includes arranging speech signal into a series of frames. A feature vector is derived which represents the speech signal for a speech segment or series of speech segments for each frame. A set of N different projected vectors are generated for each frame, by multiplying the principal discriminant matrices by the vector. This speech encoding technique is capable of being used in speech recognition systems by utilizing models, in which each model transition is tagged with one of the N classes. The projected vector is utilized with the corresponding tag to compute the probability that at least one particular speech port is present in said frame.

25 Claims, 5 Drawing Sheets

OTHER PUBLICATIONS

"A Maximum Likelihood Approach to Continuous Speech Recognition", by L. R. Bahl, et al., IEEE Transactions on Pattern Analysis and Machine Intelligence vol. PAM1–5, No. 2, Mar. 1983 pp. 179–190.

"Multonic Markov Word Models For Large Vocabulary Continuous Speech Recognition" by L. R. Bahl, et al., IEEE Transactions of Speech and Audio Processing, vol. 1, No. 3, Jul. 1993, pp. 334–343.

"Speaker Adaptation via VQ Prototype Modification" by D. Rtischev, et al., IEEE Transactions on Speech and Audio Processing, vol. 2, No. 1, Part 1, Jan. 1994 pp. 94–97.

"A Fast Approximate Acoustic Match For Large Vocabulary Speech Recognition" by L:. Bahl, et al., IEEE Transactions on Speech and Audio Processing vol. 1, No. 1, Jan. 1993, pp. 59–67.

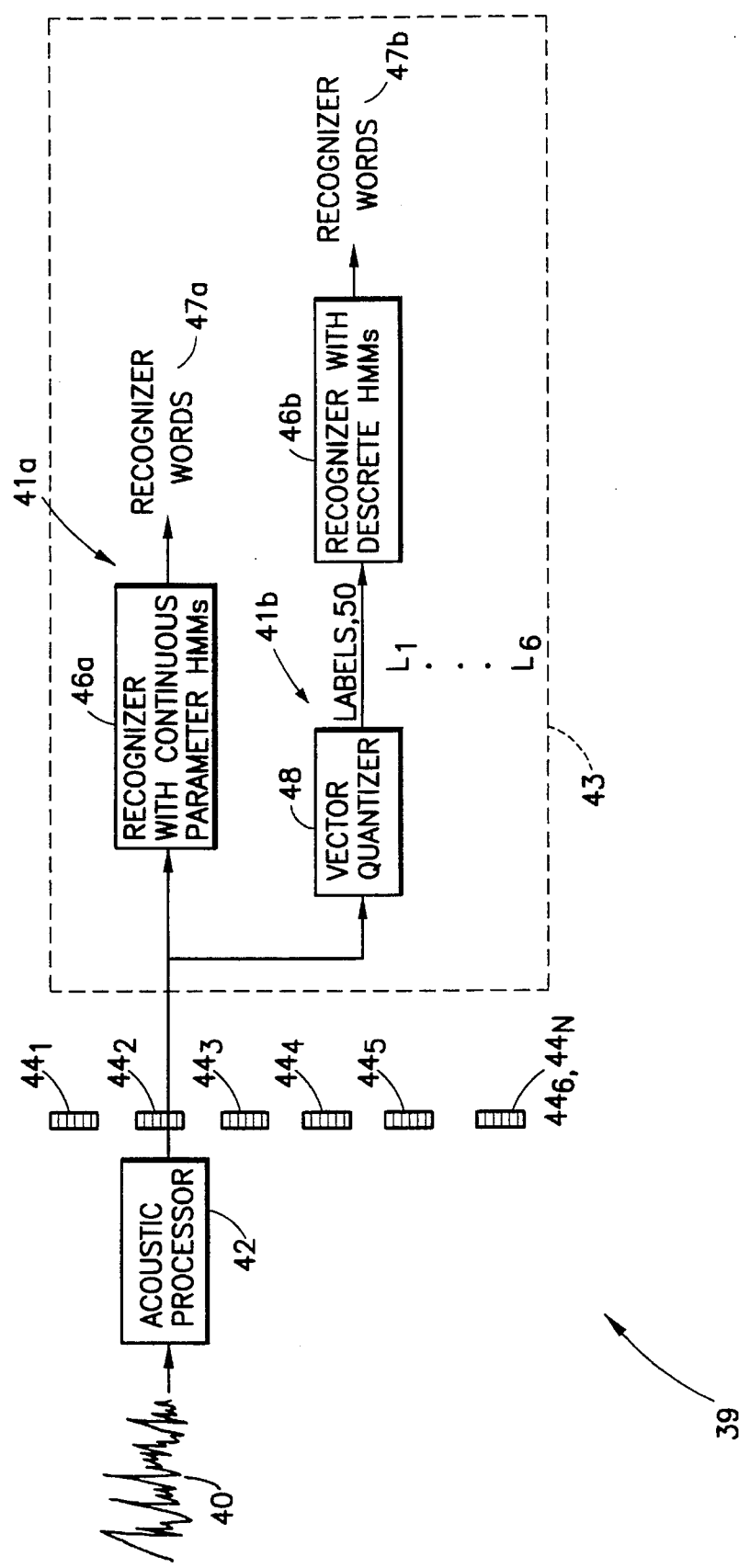

SPEECH RECOGNITION USING DYNAMIC FEATURES

FIELD OF THE INVENTION

The present invention relates to speech recognition, and more particularly to a speech recognition system and process employing dynamically varying feature extraction techniques based upon how closely spaced neighboring phones or fenones are positioned in a speech utterance. The feature extraction process is modified in response to the rate of change of the phones in the utterance, thus permitting more effective speech modelling than prior art techniques.

BACKGROUND OF THE INVENTION

In language processing, it is common for a human phonetician to segment words into sequences of phonetic elements. The phonetic elements are selected from the International Phonetic Alphabet. Phones are relatively small segments of words which trained linguists can recognize as different sounding segments of a word (for example, i,e,ae,s. all represent phones.) Typically, the phonetician listens to a word and, based upon his expertise, matches successive portions with respective phonetic elements to determine the proper phonetic spelling of a pronounced word.

Such phonetic sequences have been applied in standard dictionaries. Also, phonetic sequences have been applied to speech recognition in general, and to speech recognition utilizing Hidden Markov models (hereinafter referred to as "HMM") in particular. In the case of HMM speech recognition, the various phonetic elements are represented by respective HMMs. Each word then corresponds to a sequence of phonetic HMMs.

A sub-element of a phone is the fenone. Fenones often change so rapidly that a trained listener cannot always recognize their occurrence. For example, when the word "beat-" is spoken, the phones are recognized as "b", "e", and "t". The fenones within each phone change rapidly and a single phone can be considered to be a sequence of several fenones. The phone "t" in the word "beat" may contain several fenones, e.g. 5.

An important consequence of using sub-word building blocks such as phones and fenones is that automatic speech recognition system can be trained using a relatively small amount of data. The training data need only contain samples of each phone or fenone, instead of several samples of each word. However, if each phone is modelled independently without regard to the effects of context-dependence or co-articulation, the resulting acoustic models may be inaccurate due to the fact: that a pronunciation of a phone depends on the neighboring phones.

From the above, it can be appreciated that a technique which provides a speech recognition program which dynamically changes the projection, and thus the feature extraction based upon the position of the present phone or fenone with respect to the neighboring phones or fenones would be very useful in providing more accurate speech recognition.

SUMMARY OF THE INVENTION

One speech encoding technique embodiment of the present invention utilizes a set of N distinct principal discriminant matrices. Each principal discriminant matrix being respectively associated with a distinct class, the class is an indication of the proximity of a speech part to neighboring speech parts. The technique for speech encoding includes arranging a speech signal into a series of frames. A parameter vector is derived which represents the speech signal for each frame. A spliced parameter vector is produced for each frame by splicing several adjacent parameter vectors. A set of N different projected vectors are generated for each frame, by multiplying each of N different principal discriminant matrices by the spliced vector. This speech encoding technique is well suited for use in speech recognition systems.

BRIEF DESCRIPTION OF THE DRAWINGS

FIG. 7 is a block diagram of one embodiment of speech recognition system of the present invention.

DETAILED DESCRIPTION OF THE PRESENT INVENTION

The specific configurations, values and other parameters illustrated below are intended to be illustrative in nature, and not limiting in scope. This invention may utilize either fenones or phones in a similar manner.

The following provides a detailed description of a speech signal processing system which could use the techniques of one embodiment of the present invention described later in the detailed description.

Figure 1:
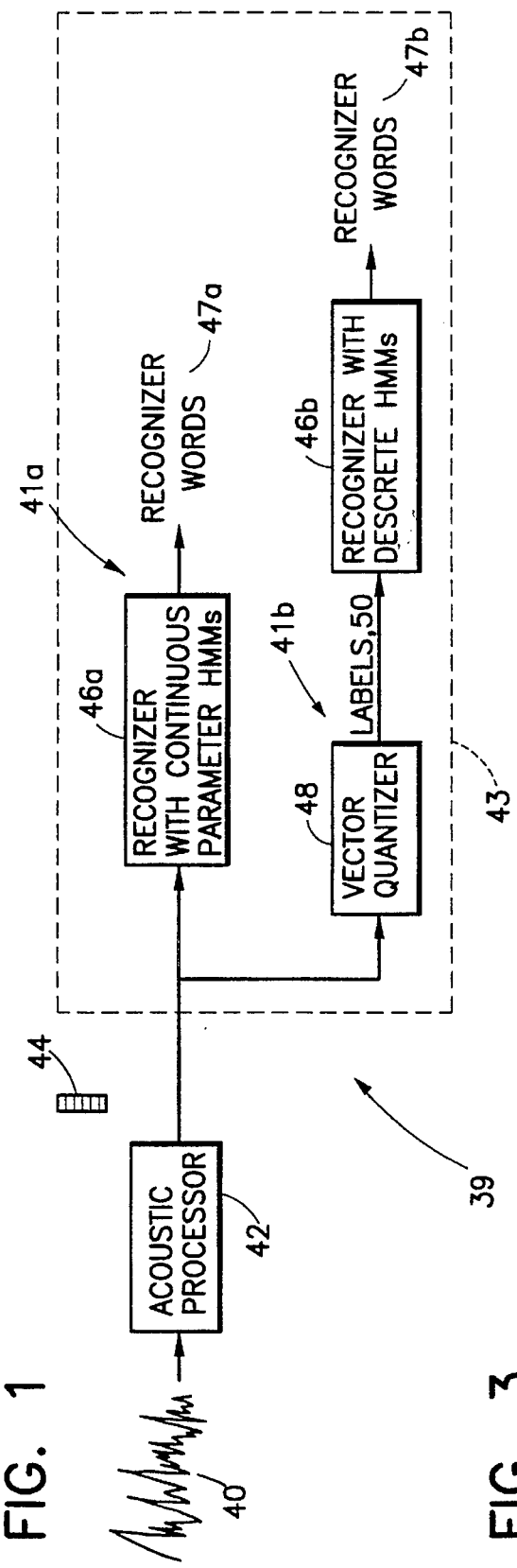
FIG. 1 is a block diagram of a speech recognition system.

FIG. 1 is a block illustration of a speech recognition system 39. The automatic speech recognition system 39 includes two major subsystems: an acoustic processor 42 and a linguistic decoder 43. The task of the acoustic processor is to produce a 50 dimensional vector 44 called a feature vector, for each time frame, in response to a spoken utterance (represented by voice signal 40, as spoken by a speaker.) Each of the parameter values of the 50 dimensional vector are arranged in a multi-dimensional coordinate system. This process is also called feature extraction. The functions and operation of the acoustic processor 42 will be provided in greater detail below with reference to FIG. 2. The linguistic decoder 43 takes the 50 dimensional vectors 44 and produces words. There are two types of linguistic decoders illustrated in FIG. 1. The first type of linguistic decoder 41a directly processes the 50 dimensional vectors 44 through a recognizer 46a, and outputs a word sequence; this type of decoder uses continuous parameter HMMs. The second type of linguistic decoder 41b utilizes a vector quantizer 48 to initially convert the 50 dimensional vectors into labels 50; and then the labels are input to a recognizer 46b which outputs a word sequence. The second type of decoder uses discrete HMMs.

Linguistic decoders utilize the output from the acoustic processor, for each frame, and attempt to find a word sequence $\hat{W}$ which has a maximum a posteriori probability given either the sequence of labels from the vector quantizer or the sequence of 50 dimensional feature vectors 44. The linguistic decoder utilizes HMMs as the probabilistic models of the distinct words, and selects the word sequence which yields the greatest probability.

The operation of the linguistic decoder is specified by the fundamental equation of speech recognition:

$$\hat{W} = \arg_w^{\max} Pr(W/A) = \arg_w^{\max} Pr(A/W)Pr(W) \tag{1}$$

where W is any sequence of words from the vocabulary and A is the sequence of observed labels or feature vectors. The final equality in this equation follows from Bayes' rule of probability, and the fact that Pr(A) is independent of W. The optimum decoder so obtained minimizes the sequence error rate.

This strategy requires probabilistic models for estimating the acoustic channel probabilities Pr(A/W) and the linguistic prior probabilities Pr(W). An aspect of this invention is the determination of the acoustic channel probabilities Pr(A/W).

Figure 2:
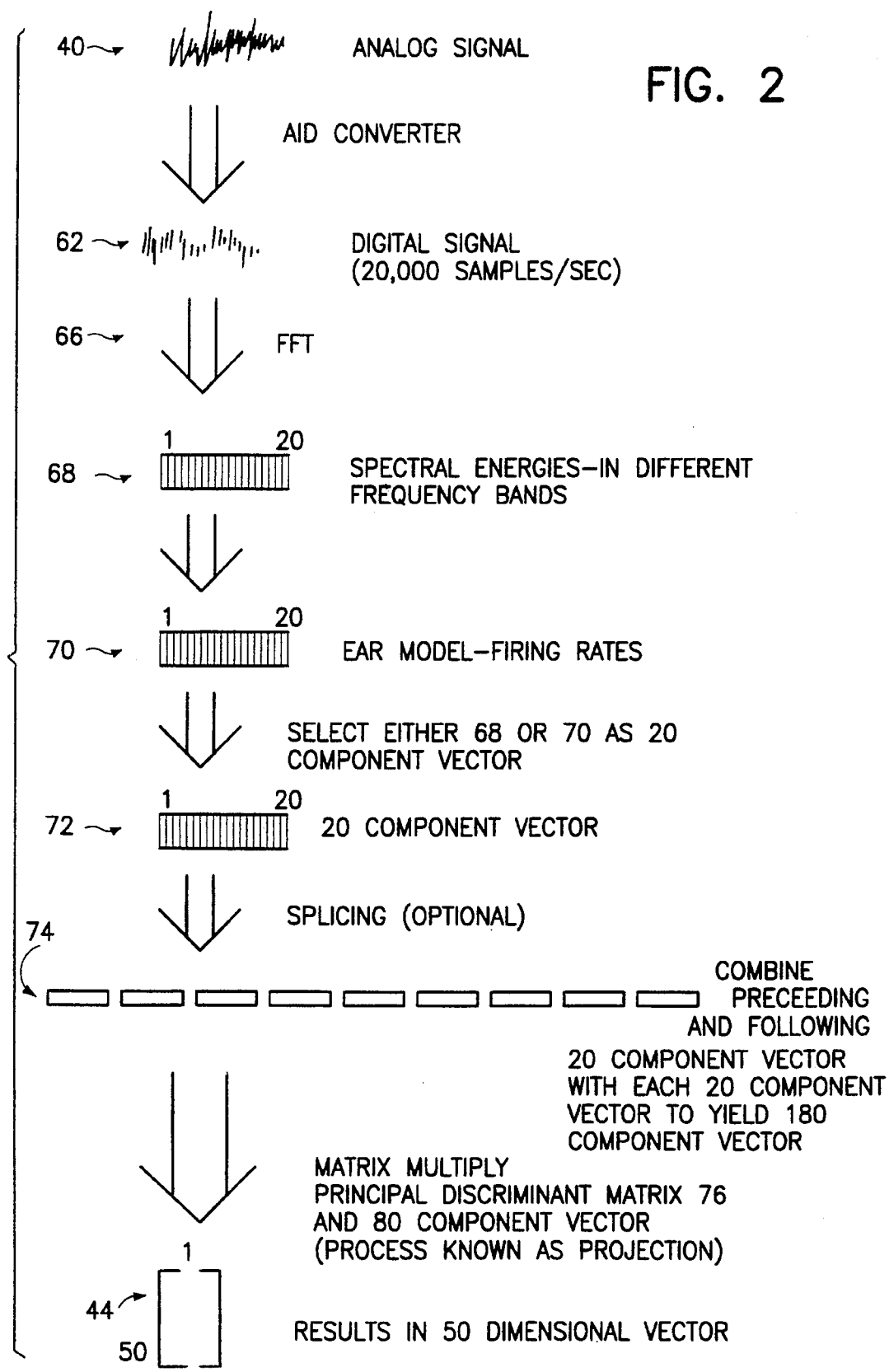
FIG. 2 is a flow chart of logic utilized by the speech recognition system of FIG. 1.

The acoustic processor 42, which is operationally illustrated in FIG. 2, samples the analog voice signal 40, and performs an A/D conversion and other signal processing steps to produce a digital representation 62 of the voice signal (typically the analog signal is sampled twenty thousand times per second in a synchronous manner.) At regular intervals, called a frame (typically 1/100 second), a block of digitized speech is transformed into the frequency domain using a Fast Fourier Transform 66 (hereinafter referred to as "FFT") to produce a vector of spectral energies 68 in different frequency bands 68. The number of frequency bands is typically 20. The steps 66, and 68 are performed once for each time frame. Optionally, the different digital frequency bands 68 are further transformed using a model of the human ear 70. The concept of the ear model is based on the realization that as the intensity in a frequency band changes, the human ear will perceive a different intensity of the sound than is actually occurring. For example, if there is a sudden step increase (greater intensity) of signal at a specific frequency, then the human ear typically will perceive a higher intensity at the beginning of the step than a short time later (even though both time frames have equal intensities over all detectable frequency bands.) The ear model 70 relates to how the dynamic characteristics of signals of certain frequencies perceived by the ear, and produces a model indicative of how the human ear would detect the intensity of the signal for each time frame and each frequency band. Any further processing may be based upon either the different spectral energies 68 or the ear model 70, and whichever vector 68 or 70 is utilized is considered a 20 component vector 72. The frequency range of the 20 component vector 72 roughly corresponds to that of the frequency range of which the typical human ear can detect.

Some, but not all, acoustic processors 42 splice together a number of 20 component vectors (usually four 20 component vectors prior to the considered 20 component vector, plus four after) to produce a spliced (or 180 component) vector 74. The spliced vector is thin projected (or, using a different term for the same process, rotated) to produce the 50 dimensional feature vector 44 illustrated in Figs. 1 and 2. The process of obtaining a 50 dimensional (projected) feature vector 44 involves multiplying a principal discriminant matrix 76 which is a 50×180 matrix, and is derived in a manner set forth below, by the 180 component (spliced) vector 74 resulting in the 50 dimensional (projected) vector 44. The 50 dimensional feature vector is thereupon utilized by the linguistic decoder 43 of FIG. 1. In those acoustic processors which do not use splicing, the 20 component vectors may be projected directly into another lower dimension space, in which case the projected vector 44 will have 20 or fewer dimensions. The feature vectors generated by the acoustic processor 42, or the labels generated by vector quantizer 48 of FIG. 1, are the same vectors or labels which can be produced as outputs along arcs of the HMMs. After arc probabilities and output probabilities are assigned during a training procedure, a recognition procedure may be followed to determine the likelihood that a verbal utterance corresponds to a certain HMM or sequence of HMMs (the sequence corresponds to a phone or word baseform). That is, given that feature vectors $V_1V_2V_3$..., or labels $f_1f_2f_3$..., etc. have been generated by the acoustic processor or vector quantizer for successive intervals of speech, the likelihood of proceeding through each path of a HMM or sequence of HMMs and producing the specific string of feature vectors $V_1V_2V_3$..., or labels $f_1f_2f_3$... can be determined. Performing this calculation for a word in a vocabulary provides a measure of that word's likelihood.

The more effective the acoustic processor and the linguistic decoder function, generally the more reliable the speech recognition system. It has been found that reliance on human phoneticians (and typical applications of phones) to define the constituent parts of a word may result in an arbitrariness in modelling, a lack of uniformity of word baseforms (i.e. sequences of constituent parts which form a word).

Vector Quantizers

A speech recognition systems where the 20 or 50 component feature vector 44 of FIG. 1 are passed through the vector quantizer 48 producing labels is described in this section. The vector quantizer 48 is followed by a HMM based recognizer 46b which computes the most likely word sequence given the observed label stream. Recognizer training, which is typically performed as part of the enrollment process for every new user of the speech recognition system, involves the computation of VQ prototypes, usually by an iterative procedure such as K-means clustering and the estimation of HMM transition and output probabilities using the forward-backward algorithm.

Viewing speech as a coordinate space, each label identifies a distinct cluster in N dimensional space, with N being an integer which corresponds to the number of the vector components. For a speech input, the acoustic processor generates a string of labels where each label corresponds to a distinct interval of speech. Basically, the acoustic processor converts the speech input into successive feature vectors generated at successive frames and assigns a label to each successive feature vector. The label which identifies the determined cluster is provided as output for the frame.

Vector Quantization Utilizing Spliced Projected Feature vectors

Vector quantizers 48 utilizing spliced projected feature vectors generally produce more accurate labels, in the vector quantization process, than vector quantizers utilizing single vectors. The steps involved in generating spliced projected vectors, and associating labels with them, are set forth below. In performing the steps, it is assumed that training data for a number of speakers has been collected and aligned (by Viterbi alignment, which is well known in speech recognition systems, and will not be further detailed herein) against existing word baseforms using spliced vectors. Preferably, each existing baseform is a sequence of phonetic or fenonic HMMs. In this disclosure, the terms "vector" and "parameter vector" are synonymous. Steps 1–5 below describe the learning process, and describe how the projected feature vectors may be constructed. The remaining steps relate to how trained spliced projected feature vectors may be used by the speech recognizer of FIG. 1 to recognize the verbal utterances which are input.

Step 1. For each twenty component vector (also known as a "standard" vector) in the training data, create a new 180 component vector (known more generally as a "spliced" parameter vector) by concatenating each twenty component vector to be considered with K preceding vectors and K succeeding vectors, thereby forming a 180 component vector. Using K=4 has been found to work well.

Step 2. Using the Viterbi alignment, for each time frame, tag the corresponding 180 component vector with the name of the phone or fenone aligned with the time frame of the original 20 component vector. Thus, the spliced vectors are allocated to one of the phones, or fenones in the phone or fenone alphabet.

Step 3. Compute the P (typically 50) best mutually uncorrelated principal discriminant matrices for discriminating between the phone or fenone types determined in Step 2 using the spliced parameter vectors. That is, consider N spliced vectors drawn from M phone or fenone types. Let $x_{ik}$ denote the $i^{th}$ element of the $k^{th}$ vector. Then, the sample covariance matrix of the data S is defined as:

$$S_{ij} = \frac{1}{N} \sum_{k=1}^{N} (x_{ik} - \bar{x}_i)(x_{jk} - \bar{x}_j) \qquad (2)$$

where $\bar{x}_i$ denotes the sample mean of the $i^{th}$ element. Let $n_i$ denote the number of vectors in the phone or fenone type i. Then the sample within phone or fenone type covariance matrix W is defined as $$W = \frac{1}{N} \sum_{i=1}^{M} n_i W_i \qquad (3)$$

where $W_i$ is the sample covariance matrix of the data in phone or fenone type i. To maximize the distinction between phone or fenone types linear discriminant functions v which maximize the ratio:

v'Sv/v'Wv, and which are mutually uncorrelated, are sought. The required vectors can be obtained as the first P principal eiganvectors matrices of the matrix $W^{-1} S$. These can be arranged as rows of a matrix called the principal discriminant matrix.

Step 4. Using the computed principal discriminant matrix, project the 180 component vectors down to the P-dimensional vectors, and tag the projected vectors with the phone or fenone of the corresponding 180 component vector.

Step 5. For each individual phone or fenone, compute the mean and variance of each of the P-dimensional projected vectors. These means and variances are formed in diagonal Gaussian prototype matrixes, and are used in labelling spliced projected feature vectors. Each prototype thus has a phone or fenone label associated with it.

Having thus computed the prototype for the labels, new data may be labelled as follows:

Step 6. Obtain twenty component vectors in the usual manner.

Step 7. Create 180 component vectors by concatenating the 20 component vectors as described in Step 1.

Step 8. Project the 180 component vectors down into P-dimensions vectors using the principal discriminant matrices obtained in Step 3.

Step 9. Label the rotated vectors using the diagonal Gaussian prototypes of Step 5; i.e., for a given rotated vector find the prototype which maximizes its likelihood, and output the label associated with the prototype. Comments on the Use of Projections The spectrum of energies 68, or ear models 70 (both of which are considered to be component vectors 72) contain a plurality of values corresponding to the energy of the time waveform in the frame within the frequency range covered by the specific spectral frequency. Vowels, for example, tend to produce most of their energy at the lower frequency ranges, and thereby have most of their energy concentrated at the lower frequency ranges in their 20 component vectors. Fricatives, by comparison, produce most of their energy at higher frequencies. Each 20 dimensional vector contains information about the instantaneous features of the speech signal in that frame. Dynamic features can be obtained by utilizing vectors for several consecutive frames.

Nine consecutive 20 component vectors 72 are spliced together to form a 180 component vector 74. There will be some overlap of the spectral features in consecutive 180 component vectors. In order to remove some of the overlap and thus reduce the redundancy in the spliced vectors, each vector is "projected" onto a lower-dimensional space (e.g. 50 dimensional) by multiplying the vector by a 50×180 matrix. The rows of this projection matrix are the principal discriminant matrices. The 180 component vectors are processed by multiplying each 180 component vector by the principal discriminant matrix.

In the above discussion, we have assumed a fixed window size and a fixed projection for all spliced vectors. A suitable speech recognition system can function with a compilation of 50 principal discriminant matrices. The projected values of a similar spoken utterances should theoretically also be similar. However, due to distinctions in pronunciations and also noise, there will be slight differences in the projected values when the same utterance is spoken by different people, or even by the same person at different times. The 180 component vectors of the splicing vector step 18 are projected to produce 50 dimensional vectors 44, or labels 50 if run through a vector quantizer as illustrated in FIG. 1.

It would be desirable to modify the window size depending upon the rate of change of the spoken utterance. During portions of the signal where the phone or fenone remains the same for several frames it would be desirable to enlarge the size of window W number of frames spliced together to provide a better estimate of the static properties of the phone or fenone. However, during brief acoustic events where the phones or fenones are altering rapidly, it is desired to decrease the size of the window W in order to avoid swamping the effects of brief events by preceding or following phones or fenones which are changing quickly. In general, it would be desirable that the size of the window W be dependant upon the proximity of the preceding and following phone or fenone boundaries.

A convenient way to achieve this desired dynamically varying window is to keep the window W large and fixed, but to have dynamically varying projections instead. Reducing the size of the window is equivalent to setting some of the values in the principal discriminant matrices projection matrix to zero. We will describe a method for constructing dynamically changing projections depending on the proximity of neighboring phones or fenones. Varying the window size is a special case of this technique.

The following illustrates one embodiment of a present invention speech signal processing system, which may be applied to the speech signal processing system described above. Let $\mathcal{S}=\{1,2,\ldots,F\}$ denote the fenone alphabet, and $\pounds=\{1, 2, \ldots, L\}$ denote the label alphabet. For each fenone $f \in \mathcal{S}$ there is a simple HMM of the type shown in FIG. 3. The model has two states, $\sigma=[f,1]$ and $\sigma=[f,2]$, where the first index identifies the fenone f and the second index identifies the initial and final state of the fenone. There is one null transition (segmented line) from $\sigma=[f,1]$ to $\sigma=[f,2]$, denoted by $p(f,n)$, where the symbol n stands for null. There are two output producing transitions (solid lines), denoted by $\psi=[f,s]$ and $\psi=[f,d]$. The symbol s stands for self-loop and identifies the transition from $\sigma=[f,1]$ to $\sigma=[f,1]$ (which permits the model to adapt to periods in the word pronunciation in which the fenone remains identical.) The symbol d stands for direct path and identifies the transition from $\sigma=[f,1]$ to $\sigma=[f,2]$. The parameters of the HMM are the 3 transition probabilities:

$$p(f,n); p(f,s); \text{ and } p(f,d) \qquad (4)$$

and the two output distributions $$q(f,s\zeta) \text{ and } q(\hat{f},d, \zeta), \zeta \in \pounds. \qquad (5)$$

The parameters in (4) and (5) are the fenonic parameters.

Given the F elementary fenonic HMMs defined in (4) and (5), we can construct a fenonic HMM for each acoustic unit to be modeled such as a word, a phone, a syllable, etc. For each such acoustic unit, we extract a number of label sequences, say $Y_1, Y_2, \ldots, Y_N$, from a sample of training data, and seek the sequence of fenones B that best models these observed label sequences. The fenone sequence B which has the highest probability of generating the set of observed label sequences can be described as:

$$B = \arg_{B_j}^{max} \prod_{i=1}^{N} Pr(Y_i|B_j). \qquad (6)$$

The above maximization over all possible fenone sequences $B_j$ is carried out using a stack search procedure. The sequence solution is referred to as the fenonic baseform for the acoustic unit considered.

Figure 4:
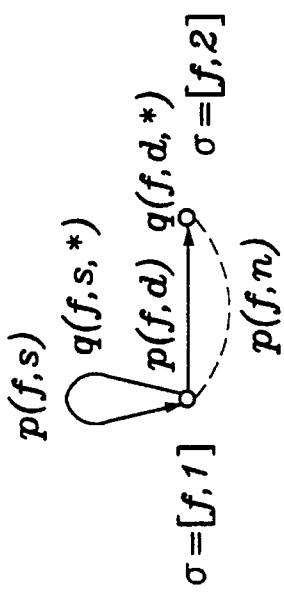
FIG. 4 is one embodiment of a HMM for a word, in which a plurality of HMMs for fenones are concatenated.

Assume, for example, that words are the acoustic unit. Then the fenonic baseform for each word w is represented by a linear sequence of length N(w) such as $$B(W)=[f(w, 1), f(w, 2), \ldots, f(w,N(w))], \qquad (7)$$

where each fenone $f(w,i)$ is in F. In this notation, the first index identifies the word w, and the second the position in the baseform. The word HMM for w is constructed by concatenating the elementary fenone HMMs present in B(w). An example of a word HMM is shown in FIG. 4. The states of this model are denoted by $\sigma=[w,i]$, for $i=1,2,\ldots, N(w)+1$, where again the indexes identify word and position within word, respectively. Note that the final state position index has value N(w)+1. The direct path through this model should be configured to represent an average pronunciation of the word, while the loops or the null transitions allow for any respective lengthening or shortening of the pronunciation by the speaker.

There are two related processes which are involved with speech processing. The first process is a "learning process" in which parameters are learned as known input is read into the acoustic processor. The second process is a "recognition process", which is performed after the learning process, wherein unknown words are read into the speech recognizer program and the alphanumeric equivalent of the spoken utterance is displayed.

Figure 5:
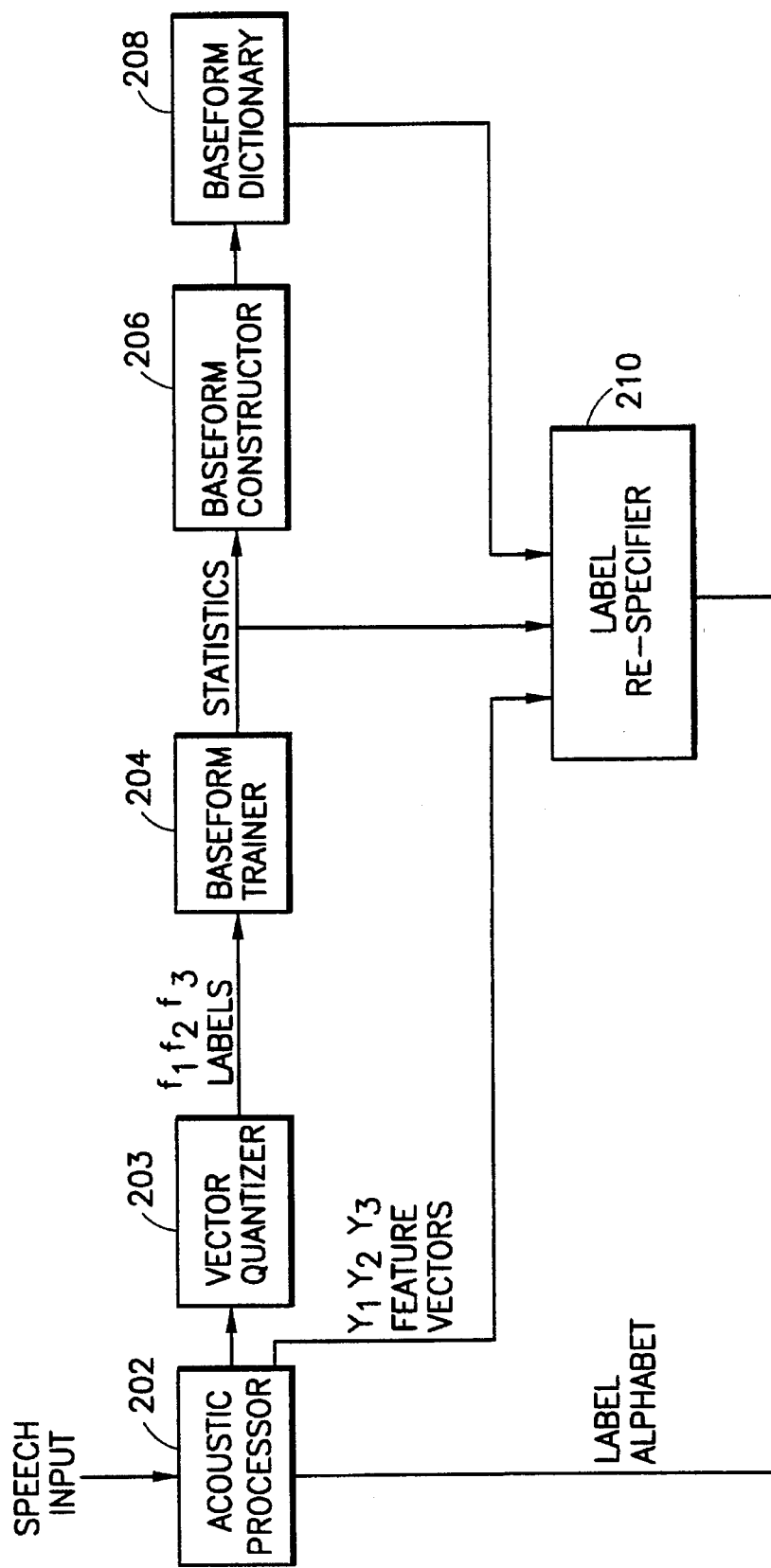
FIG. 5 is a block diagram illustrating an apparatus which is capable of specifying labels and constructing HMM word baseforms interdependently according to the present invention.

A related Patent is U.S. Pat. No. 5,072,452, issued Dec. 10, 1991 to Brown et al (incorporated herein by reference in its entirety.) Referring to FIG. 5, which relates to both the recognition process and the learning process, speech input is shown entering an acoustic processor 202. The speech input is in the form of an acoustic waveform. Parameters of an alphabet of, for example, two hundred labels L1, L2, L3, . . . , L200 (assuming that a discrete linguistic decoder is being used), or vectors (for a continuous linguistic decoder) are stored in the acoustic processor.

In preparing acoustic waveforms for the process of assigning labels to successive frames, the speech analog waveform is digitized, time intervals are generated, and the digital signal is passed through a Fast Fourier Transform as well known in the art. The outputs of the acoustic processor 202 includes labels $f_1 f_2 f_3 \ldots$, etc. and feature vectors $Y_1 Y_2 y_3 \ldots$, etc. In other words, there is a feature vector and a label output from the acoustic processor which corresponds to each frame.

The labels $f_1 f_2 f_3 \ldots$, etc. from the acoustic processor 202 enter a baseform trainer 204. The baseform trainer 204 is used to determine the probabilities which are to be applied to the HMMs in each word baseform, where each "word baseform" represents a prescribed sequence of HMMs. Each HMM is stored in memory as arc probabilities and label probabilities.

The probabilities are computed during the training session in which known text is uttered. For the known text, there is a corresponding known sequence of HMMs. When the known text is uttered by a speaker into an acoustic processor (e.g., processor 202), a string of labels is generated. By employing the well known Forward-Backward algorithm, probabilities for the arcs and for the labels produced at the non-null arcs of the HMM are computed by the baseform trainer 204. The probability statistics computed by the baseform trainer 204 enter a baseform constructor 206. The baseform constructor 206 determines the sequence of HMMs for each word. The sequence of HMMs for each word and the arc probabilities and label output probabilities for each non-null arc of the HMM are stored in a baseform dictionary 208.

In particular, the baseform dictionary 208 stores the following types of data items:

NNODES$_x$=the number of nodes in the x word baseform.

NID$_{ij}$=the node identifier of the $j^{th}$ node in the $i^{th}$ word baseform.

NT$_{ij}$=the number of arcs (transitions) from node NID$_{ij}$.

TID$_{ijk}$=the number of arcs (transitional) from node NID$_{ij}$

S$_{ijk}$=statistics pointer for arc (transition) T$_{ijk}$.

During training, baseform data (i.e. HMM sequences and probability statistics therefore) and the feature vectors corresponding to successive speech intervals enter a label re-classifier 210. The label reclassifier 210 redefines the prototype vectors and clusters associated with the labels based upon the data generated during the word baseform construction.

Figure 6:
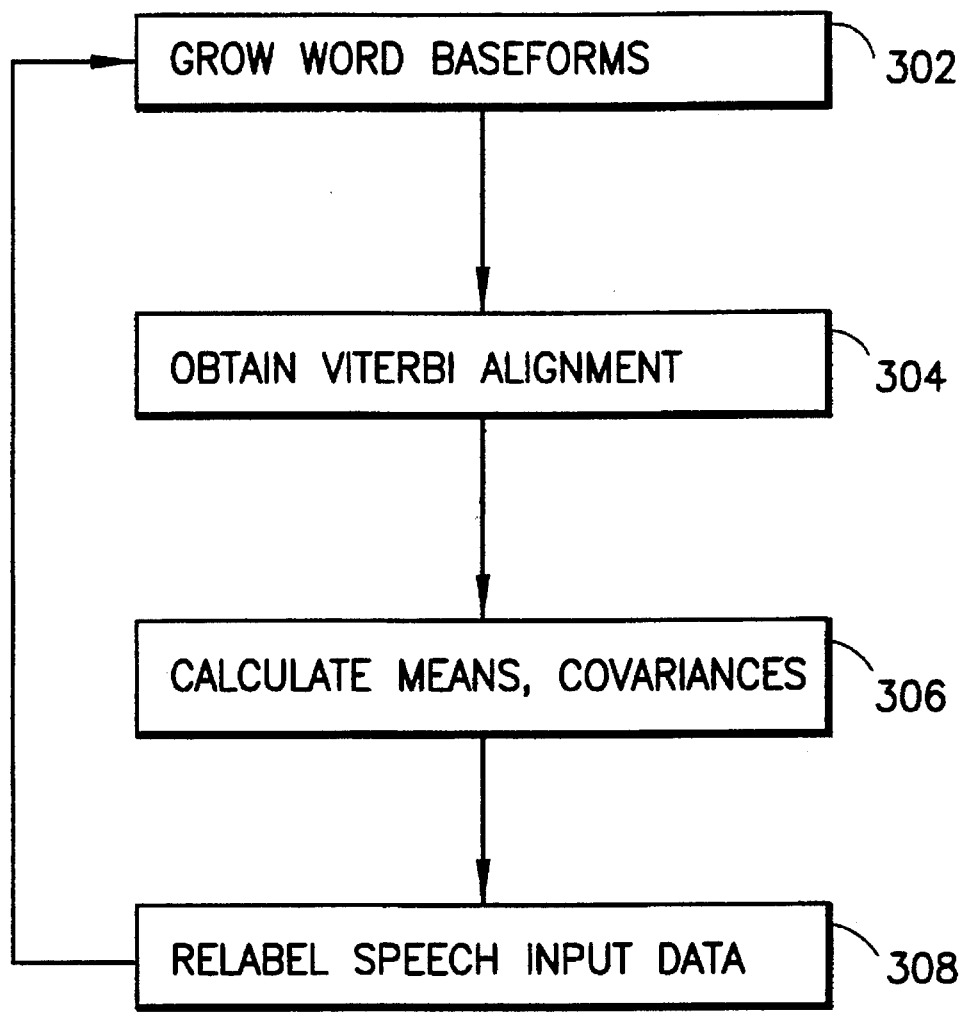
FIG. 6 is a flow diagram illustrating the general steps performed in re-specifying labels and constructing HMM word baseforms interdependently according to the present invention.

The operation of the apparatus of FIG. 5 is reflected in FIG. 6, which illustrated the four major steps by which baseforms are "grown". During the training session, words are uttered in a known order and strings of labels are generated in response to the utterances in a Grow Word Baseform Step 302. In a Matching Procedure Step 304 (referred to as the Viterbi Alignment), successive substrings of labels generated, in response to uttering the training text, are associated with each HMM in the word baseform. Accordingly, for the first HMM in the first word uttered in the training text, there is an aligned substring of labels; for the second HMM there is a second substring, and the process continues until all of the HMMs have second substrings.

Figure 3:
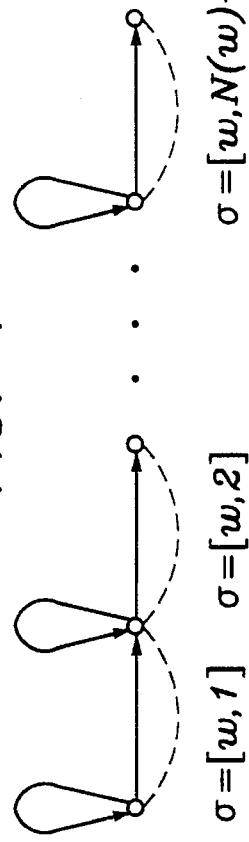
FIG. 3 illustrates one embodiment of a Hidden Markov model (HMM) for a fenone.

Each label corresponds to a prototype vector and each label is selected by comparing a feature vector input for an interval of speech with each prototype vector—the label of the "closest" prototype vector being assigned to that frame. Each HMM in the set of HMMs corresponds to a label in the label alphabet, and preferably has a simpler structure than the phonetic based HMMs. The fenemic HMM is illustrated in FIG. 3. "Feneme" is an alternate expression for "label". In particular, the fenemic HMM of fenone S of FIG. 3 has two states [f,1] and [f,2]; a non.-null loop extending from the state [f,1] back to itself; a non-null loop extending from state [f,1] to state [f,2]; and a null arc extending from state [f,1] to [f,2]. Each of the three arcs has a respective probability of being followed p(f,s), p(f,d), and p(f,n).

In FIG. 6, the baseforms of step 302 are preferably sequences of fenemic HMMs and the Viterbi alignment step 304 involves the associating of each fenemic model with labels. In step 304, the label aligned and associated with a given HMM is identified. Also identified are the feature vectors from which the labels (corresponding to the fenemic HMM) are derived. For each fenemic HMM, there are zero, one, two, or more feature vectors associated therewith. In step 306, the feature vectors identified for each fenemic HMM are combined to estimate mean values and covariance values.

The computed means and covariances for each fenemic HMM are used in re-labelling incoming speech data pursuant to step 308. In particular, in selecting labels corresponding to a given interval of speech, the feature vector generated therefor is compared to the means and the covariances are specified for each label (derived in step 306). That is, the means and covariances for a fenemic HMM corresponding to label j are used to determine the distance between an input feature vector and the label j. Stated briefly, each $j^{th}$ label is respecified based upon the means and covariances of the fenemic HMM corresponding to the $j^{th}$ label. The new specification of labels are entered into the acoustic processor 202 of FIG. 3. The acoustic processor 202 then labels speech based upon the re-specified labels.

Label/Fenone Alphabet

A phone may regularly vary in length. For example, the word "beat" contains the phones b, e, and t. The "b" and "t" are phones which are relatively quickly spoken, while the phone "e" is much longer drawn out than either of the other two. It is also true that over the short duration of the "b" and "t" phones, the feature vectors will be more uniform than across the relatively long duration of the "e" phone.

Assume that the training data is aligned against a phonetic representation of the training script. In order to determine how quickly the phones are changing in a spoken utterance, a label/fenone alphabet is used. The label fenone alphabet consists of each of a set of basic fenones as well as a class associated with each fenone or phone. The class provides an indication as to how quickly the phone is changing. The following classes (1 to 6) are tagged to each phone. While this segment is described with reference to tagging phones, it is also possible to apply similar steps to tag fenones:

1. If frame F belongs to a phone whose duration is M frames or less, set the tag for each frame in the phone at 1; otherwise, proceed with step 2. A reasonable value for M is 5. M is a value which defines the upper duration of a relatively short phone.
2. If the window of frame F overlaps the preceding phone (there are characteristics of both phones in the window) by N frames or more, set the value of the tag at 2. In other words, the tag values of the first one or two frames in phone windows will be set at 2. Otherwise proceed with step 3. A reasonable value for N is 3.
3. If the window overlaps the following phone (there are characteristics of both the present and the following phone in the window) by N frames or more, set frame tag at 6. Otherwise proceed with step 4.
4. If the window overlaps the preceding phone at all, set the tag to 3. Otherwise proceed with step 5.

If the window overlaps the following phone at all, set the tag to 5. Otherwise proceed to step 6.

6. Set the tag to 4.

Pictorially, for a 9-frame window with M=5 and N=2, the tag associated with a single phone utterance may be constructed as illustrated in Table 1. Table 1, as well as the above description is intended to be illustrative in nature as to how to construct a label/fenone alphabet, and is not intended to be limiting in scope. Note that when a single phone lasts less than 4 frames, it is assumed, that the feature vectors are more uniform over the duration of these frames than for longer duration phones. Conversely, the phones which last for a relatively long duration tend to vary considerably over their duration.

TABLE 1

Tags Associated With a Single Phone Utterance

| Phone Length | Tags |
|---|---|
| 1 | 1 |
| 2 | 1 1 |
| 3 | 1 1 1 |
| 4 | 1 1 1 1 |
| 5 | 1 1 1 1 1 |
| 6 | 2 2 3 3 6 6 |
| 7 | 2 2 3 3 5 6 6 |
| 8 | 2 2 3 3 5 5 6 6 |
| 9 | 2 2 3 3 4 5 5 6 6 |
| 10 | 2 2 3 3 4 4 5 5 6 6 |

Following the above technique, the tags output for a verbal utterance produced by a relatively slow speaker will vary when compared to the same verbal utterance spoken by a relatively fast speaker. For example, as a slow speaker pronounces the "M" in Mary, then the series of phone/tag combinations will be similar to:

M2 M2 M3 M3 M5 M5 M6 M6, whereas when a quick speaker pronounces the same word, the M will appear as:

M1 M1 M1 Mi.

The phone / tag combination defines a potential collection of 6P categories where P is the number of phones. Treating each of the 6P categories as separate acoustic events leads to an acoustic alphabet of size 6P (which corresponds to the number of labels). The frames associated with each category may be regarded as samples of a given label from which label prototypes may be constructed. Defining fenones or phones in a one to one correspondence with these labels in the conventional manner leads to an alphabet of 6P fenones.

Varying Window Size Utilizing Principal Discriminants

One embodiment of the technique of the present invention, which provides for dynamically varying windows based upon the characteristics of the speech, keeps the window size large, while using dynamically varying principal discriminant matrices which effectively alter the width of the window. This can be accomplished in a principal discriminant matrix by setting some of the entries in the matrix to zero.

The following provides a technique for constructing different projections for each of the six tag classes discussed earlier. Principal discriminant matrices are computed in the following manner:

1. Construct a label/fenone alphabet in which each fenone is associated with a particular phone, and a tag (depending on the number of frames from which the same phone extends.) This is accomplished as previously described in the Label/Fenone Alphabet section of this disclosure.
2. Align some training data against an acoustic HMM of the training script using Viterbi alignment, and thereby tag each frame of the training data with the identity of the true label as determined by the alignment. Viterbi alignment is well known in speech recognition systems, and will not be further detailed herein.
3. For each distinct frame tag F represented in the Label/Fenone Alphabet, perform steps 4 and 5.
4. Collect all frames of the training data whose true label from step 2 is associated with frame tag F.
5. Using the subset of frames collected in step 4, compute the principal discriminant matrix which discriminates maximally between the set of labels present in the data (i.e. all those labels associated with the frame tag F.)

At the completion of step 5, a distinct principal discriminant matrix (there will be 6) will have been constructed for each frame tag value represented in the Label/Fenone Alphabet of step 1. The principal discriminant matrix associated with frame tag F is optimized for discriminating amongst tags having value F. Because the manner in which the Label/Fenone Alphabet is constructed, each set of principal discriminant matrices distinguishes between all possible phones (since all phones are represented in each subset F of the Label/Fenone Alphabet).

Each class represents a different frame position relative to phone boundaries, as described in detail above. Different principal discriminant matrix projections result from different classes. Therefore, the principal discriminant matrix projections vary with different frame positions relative to the phone boundaries.

The principal discriminant matrices are used during fenone-based trellis calculations as follows. Let X denote the unprojected acoustic vector at time T. Let A denote an arc which is a candidate to output X, and let B denote the fenone to which A belongs. Let F be the frame position associated with fenone B as determined in step 1.. Let E be the principal discriminant matrix associated with frame portion F as constructed in step 5 of the principal discriminant matrix calculation described above. Project X using principal discriminant matrix E, and let Y(A) denote the projected vector. The likelihood, or output probability, associated with arc A at time T is determined in the conventional manner using the arc-dependant projected vector Y(A).

FIG. 7 is a block diagram of one embodiment of a speech recognition system of the present invention. Instead of a single 50 dimensional vector 44 being produced as is the case with the acoustic processor 42 of FIG. 1; the FIG. 7 embodiment utilizes 6 different principal discriminant matrices which produce six distinct 50 dimensional vectors $44_1$, $44_2, \ldots, 44_6$, with the suffix describing the class. Since there are six distinct 50 dimensional vectors $44_1$ to $44_6$ produced by the acoustic processor 42 of FIG. 7, each of the 50 dimensional vectors can be input into the vector quantizer 43 to produce six distinct respective labels $L_1$ to $L_6$. Either the six distinct 50 dimensional vectors $44_1$ to $44_6$ can be processed through the recognizer 46b to produce an output word sequence, or the six distinct labels $L_1$ to $L_6$ can be processed through the recognizer 46b to produce an output word sequence. Using the more precise classification technique of the phones of the present invention, the recognizer can function more precisely than in prior art systems.

A continuous speech recognition experiment was performed on a speaker who read 50 sentences covered by a 5000 word vocabulary. The number of recognition errors fell significantly when a single global set of principal discriminant matrices was replaced by 6 sets, which were constructed as described above.

The label/fenone alphabet provides a technique by which the degree of edge induced distortion that can be expected is quantified (for example, the frames which are tagged with a value of 4 have no overlap.) in accordance with an aspect of this invention, by separating labels with severe, mild, or no edge induced distortion for each frame, superior acoustic modelling is achieved.

The above provides one embodiment of a speech recognition system. This embodiment may be modified while remaining within the scope of the present invention. While the claims and disclosure are described primarily with reference to phones, it is also possible to configure a similar speech recognition system based upon fenones. For this reason, in the claims the term "speech segment" will be intended to cover fenones as well as phones.

We claim:

1. A method for speech encoding, comprising the steps of:

producing a set of N distinct principal discriminant matrices, each principal discriminant matrix being associated with a different class, each class being an indication of the proximity of a speech segment to one or more neighboring speech segments, arranging a speech signal into a series of frames;

deriving a feature vector which represents said speech signal for each frame; and generating a set of N different projected vectors for each frame, by multiplying each of said N distinct principal discriminant matrices by said feature vector.

2. The method as described in claim 1, further comprising the step of:

splicing a series of adjacent feature vectors together to derive a spliced vector.

3. The method as described in claim 1, further comprising the step of:

tagging each frame with one of said classes.

4. The method as described in claim 1, wherein said indication of the proximity of a speech segment to one or more neighboring speech segments includes an indication of different amounts of overlap with said neighboring speech segments.

5. A method for speech recognition, the method of speech recognition comprising the steps of:

deriving N distinct transformations, each distinct transformation is respectively associated with one of N classes, each class providing an indication of the proximity of a speech segment to one or more neighboring speech segments, arranging a speech signal into a series of frames;

deriving a vector, within each said frame, which represents said speech signal;

generating a set of N different projected vectors for each frame, by multiplying said transformations by said vector;

utilizing models for tagging each model transition with one of said N classes; and utilizing the projected vector with the corresponding tag to compute a probability that a particular speech segment is present in said frame.

6. The method as described in claim 5, wherein said models are based on fenones, and each fenone is always associated with one of said N tags.

7. The method as described in claim 5, wherein said models are based on phones, and each phone is associated with one of said N tags.

8. The method as described in claim 5 further comprising the step of:

splicing a series of adjacent vectors together to derive a spliced vector.

9. The method as described in claim 5, wherein said indication of the proximity of a speech segment to one or more neighboring speech segments includes an indication of different amounts of overlap with said neighboring speech segments.

10. The method as described in claim 5, wherein said transformations are principal discriminant matrices.

11. An apparatus for speech encoding comprising:

means for producing a set of N distinct principal discriminant matrices, each principal discriminant matrix being associated with a different class, the class being an indication of the proximity of the speech segment to one or more neighboring speech segments;

means for arranging a speech signal into a series of frames;

means for deriving a feature vector which represents said speech signal for each frame; and means for generating a set of N different projected vectors for each frame, by multiplying each of said principal discriminant matrices by said vector.

12. The apparatus described in claim 11, further comprising:

means for splicing a series of adjacent feature vectors together to derive a spliced vector.

13. The apparatus described in claim 11, further comprising:

means for tagging each frame with one of said classes.

14. The apparatus described in claim 11, wherein said indication of the proximity of a speech segment to one or more neighboring speech segments includes an indication of different amounts of overlap with said neighboring speech segments.

15. A speech recognition system comprising:

means for arranging speech segments into a series of frames;

means for deriving a vector, within each of said frames, which represents said speech signal;

means for deriving N distinct transformations, each distinct transformation is respectively associated with one of N classes, each class providing an indication of the proximity of a speech part to neighboring speech parts, means for generating a set of N different, projected vectors for each frame, by multiplying said N transformations by said vector;

means for utilizing models for tagging each model transition with one of said N classes; and means for utilizing the projected vector with the corresponding tag to compute the probability that a particular speech part is present in said frame.

16. The system described in claim 15, wherein said models are based on fenones, and each fenone is always associated with one of said N tags.

17. The system described in claim 15, wherein said models are based on phones, and each phone is associated with one of said N tags.

18. The system described in claim 15, further comprising:

means for splicing a series of adjacent vectors together to derive a spliced vector.

19. The system described in claim 15, wherein said indication of the proximity of a speech part to neighboring speech parts includes an indication for different amounts of overlap with neighboring speech parts.

20. The apparatus described in claim 15, wherein said transformations are principal discriminant matrices.

21. A method for speech recognition which comprises the steps of:

arranging a speech signal into a series of frames;

varying the width of one or more windows to be utilized for a speech encoding system in accordance with a principal discriminant matrix, each window being defined as a number of successive frames which have a same speech segment associated therewith;

deriving a feature vector which represents said speech signal for each frame; and generating a projected vector for each frame by multiplying said principal discriminant matrix by said feature vector, wherein said principal discriminant matrix represents the values of the projected vectors which are indicative of the speech signal.

22. The method as described in claim 21, wherein there are N principal discriminant matrices which are associated with N respective, distinct classes, the different classes being an indication of the proximity of the speech segment to neighboring speech segments.

23. An apparatus which comprises:

means for arranging a speech signal into a series of frames;

means for varying the width of one or more windows to be utilized for a speech encoding system, based upon a principal discriminant matrix, each window is defined as the number of successive frames which has the same speech segment associated with it, means for deriving a feature vector which represents said speech signal for a speech segment or series of speech segments for each frame; and means for generating a projected vector for each frame by multiplying said principal discriminant matrix by said feature vector, wherein said principal discriminant matrix equates the values of the projected vectors which are representative of the speech signal.

24. The apparatus as described in claim 23, wherein there are N principal discriminant matrices which are associated with N respective, distinct classes, the different classes being an indication of the proximity of the speech segment to neighboring speech segments.

25. A method for applying a value to each tag from a series of tags, to be utilized in a speech recognition application, comprising the steps of:

determine whether a frame F belongs to a phone whose duration is M frames or less, if so, set the tag for each frame in the phone at a first value; otherwise, proceed with the next step;

determine whether the window of frame F overlaps the preceding phone by N frames or more, if so, set the value of the of the tag at a second value, otherwise proceed with the next step;

determine whether the window overlaps the following phone by N frames or more, if so, set frame tag at a third value, otherwise proceed with the next step;

determine whether the window overlaps the preceding phone at all, if so, set the tag to a fourth value, otherwise proceed with the next step;

determine whether the window overlaps the following phone at all, if so, set the tag to a fifth value, otherwise proceed to the next step; and set the tag to a sixth value.

* * * * *